Jan. 31, 1928.

J. W. EDBLAD 1,657,885

STARTER FOR INTERNAL COMBUSTION ENGINES

Filed April 15, 1925

WITNESS:
G.W. Hjelm

INVENTOR
J.W. Edblad
BY
H.J. Sanders
ATTORNEY

Patented Jan. 31, 1928.

1,657,885

UNITED STATES PATENT OFFICE.

JOHN WALFRID EDBLAD, OF WESTEROSE, ALBERTA, CANADA.

STARTER FOR INTERNAL-COMBUSTION ENGINES.

Application filed April 15, 1925. Serial No. 23,291.

This invention relates to starting devices for internal combustion engines and its object to to provide novel starting means, manually operated, wherein the possibility of injury to the party operating the said means is positively eliminated. The starting device is applicable to vehicles that are propelled by explosive engines but it is particularly adapted for use upon tractors, trucks and the like that are not ordinarily provided with the conventional type of starter; it can also be installed cheaply upon automobiles of the inexpensive type that are often purchased without starters for the sake of economy and to reduce the first cost of the vehicles.

With the foregoing and other objects in view the invention consists in the combination and arrangement of parts to be hereinafter fully described, pointed out in the appended claims and illustrated in the accompanying drawing which forms a part of this application and in which—

Fig. 1 is a plan view illustrating the application of the starting device to an automobile.

Fig. 2 is a view of Fig. 1 in end elevation.

Fig. 3 is a view of Fig. 1 taken from the opposite end to that from which Fig. 2 is taken.

Like reference characters denote corresponding parts throughout the several views.

Figures 1, 2, 3:
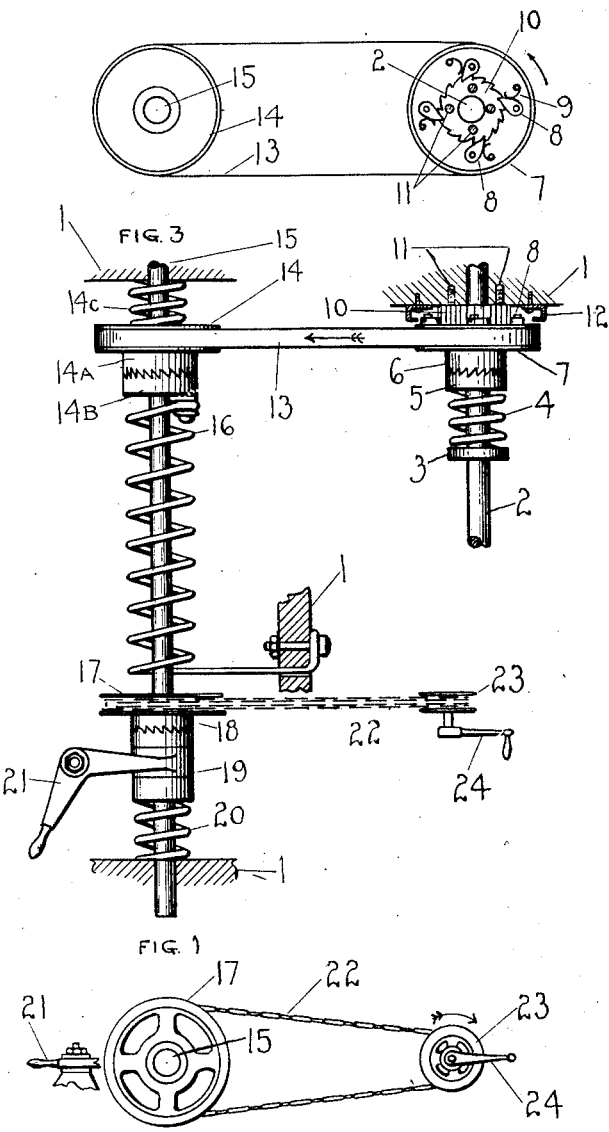

The reference numeral 1 denotes the automobile chassis and 2 the motor crank shaft to which a collar 3 is made fast, a spring 4 encircling said shaft has one end secured to the collar 3 and the opposite end engaging a clutch member 5 keyed to shaft 2 to keep it in engagement with the co-operating clutch member 6 integral with the pulley 7 and loose upon said crank shaft.

One face of the pulley 7 is provided with pawls 8 kept, through the medium of the springs 9, in mesh with the teeth of the wheel 10 which is loose upon shaft 2 and is positively secured against rotation by the screws 11 which secure it to the chassis 1. As the pulley 7 rotates in one direction the pawls 8 ride over the teeth of the wheel 10 but the movement of the pulley will be instantly arrested, as well as the movement of the crank shaft, should the pulley start to reverse. A casing 12 is provided for the wheel 10 and pawls 8 to muffle the noise caused by the travel of the pawls over said wheel.

A belt 13 connects the said pulley 7 to a pulley 14 loose upon the starter shaft 15, said pulley being integral with a clutch member $14^a$ loose upon shaft 15 and kept yieldingly in engagement with the clutch member $14^b$, fast upon shaft 15, by the spring $14^c$, said clutch member $14^b$ being connected by a coil spring 16, that encircles said starter shaft, with the chassis of the vehicle. Another pulley 17 loose upon the starter shaft is connected by the clutch member 18, normally, to another clutch member 19 fast upon the shaft 15, said clutch members being yieldingly retained in engaged relation by the expansion coil spring 20 that abuts the clutch member 19 and the chassis. A handle 21 is provided for the clutch member 19 so that it may be released from the clutch member 18 when necessary. A chain 22 connects the pulley 17 and a small pulley 23 adapted to be rotated by the hand crank 24.

In operation, when it is desired to start the motor, the hand crank 24 is rotated. This, through the medium of the clutch 18, 19 rotates the starter shaft 15 and tightens the spring 16. The spring 16 will rotate the clutch member $14^b$ and the starter shaft but this clutch member will ride out of engagement with the clutch member $14^a$ and not rotate the same. When the spring 16 is wound up, or tightened, the operator disengages the clutch members 18, 19 by means of the handle 21 and releases the crank 24. The spring 16 will then unwind and turn the starter shaft in a direction to operatively engage the clutch members $14^b$, $14^a$ thus rotating the pulleys 14 and 7 with clutch members 6 and 5 thus turning over the crank shaft 2. This operation will cause the motor to start which will thereafter drive the crank shaft which will rotate the clutch member 5 but disengage the same from the clutch member 6 thus permitting the pulley 7 to idle upon the shaft. Should the engine back-fire it will do so before it has acquired much speed or power and the pawls 8 in engagement with the wheel 10 fast upon the crank shaft will promptly arrest the reverse movement of shaft 2 and "kill" the motor without working injury to the operator in any manner.

What is claimed is:—

1. In a starter for internal combustion engines, a starter shaft, a pulley loose upon said shaft, a clutch member integral with said pulley and loose upon said shaft, a co-operating clutch member keyed to said starter shaft, a spring encircling said shaft and having one end secured to said co-operating clutch member and its opposite end fast to a stationary support, a second pulley loose upon said starter shaft, manually operable means for driving said pulley, clutch mechanism for releasably connecting said second pulley and starter shaft, a pulley loose upon the engine crank shaft, clutch mechanism for securing said pulley to said crank shaft during movement of said pulley in one direction, and means connecting said pulley, crank shaft and an external support whereby movement of said pulley and crank shaft in reverse direction is instantly arrested.

2. In a starter for internal combustion engines, a starter shaft, loose pulleys upon opposite ends of said shaft, clutches for releasably connecting said pulleys to said shaft, a coil spring encircling said starter shaft and connected to one of said clutches, hand lever control for the opposite clutch, direct manually operable driving means for one of said pulleys, a pulley loose upon the engine crank shaft and belt-connected to one of said first named pulleys, a clutch for connecting one pulley direct to said crank shaft when said pulley rotates in a predetermined direction, and means connecting said last named pulley, crank shaft and an external support whereby movement of said pulley and crank shaft in a reverse direction is arrested.

3. In a starter for internal combustion engines, a starter shaft, loose pulleys upon opposite ends of said shaft, clutches for releasably connecting said pulleys to said shaft, a coil spring encircling said starter shaft and connected to one of said clutches, hand lever control for the opposite clutch, manually operable driving means for one of said pulleys, a pulley loose upon the engine crank shaft and belt-connected to one of said first named pulleys, a clutch for connecting one pulley direct to said crank shaft when said pulley rotates in a predetermined direction, a stationary toothed wheel loose upon said crank shaft, and spring pawls connecting the last named pulley and said toothed wheel whereby reverse movement of said pulley is instantly arrested.

4. In a starter for internal combustion engines, a starter shaft, a crank shaft, means operatively connecting the shafts including an irreversable clutch on the starter shaft, spring means for rotating the starter shaft in one direction, manual means for placing the spring under tension, and releasable means for disengaging the manual means from the spring means, as and for the purpose specified.

In testimony that I claim the foregoing as my own I have hereto affixed my signature.

JOHN WALFRID EDBLAD.